United States Patent [19]

Yorita

[11] Patent Number: 4,768,218
[45] Date of Patent: Aug. 30, 1988

[54] RADIO KEY TELEPHONE SYSTEM HAVING A COMMON SIGNALING CHANNEL

[75] Inventor: Takeo Yorita, Tokyo, Japan

[73] Assignee: NEC Corporation, Tokyo, Japan

[21] Appl. No.: 43,060

[22] Filed: Apr. 27, 1987

[30] Foreign Application Priority Data

Apr. 26, 1986 [JP] Japan .................................. 61-95894
May 27, 1986 [JP] Japan .................................. 61-120226
Aug. 25, 1986 [JP] Japan .................................. 61-198707

[51] Int. Cl.$^4$ ......................................... H04M 11/00
[52] U.S. Cl. ........................................ 379/61; 379/63
[58] Field of Search ...................... 379/61, 62, 63, 60, 379/58; 455/33

[56] References Cited

U.S. PATENT DOCUMENTS

| | | | |
|---|---|---|---|
| 4,538,028 | 8/1985 | Gazzoli et al. | 379/61 |
| 4,538,029 | 8/1985 | Gazzoli et al. | 379/61 |
| 4,628,152 | 12/1986 | Akerberg | 379/61 |
| 4,640,987 | 2/1987 | Tsukada | 379/62 |
| 4,646,345 | 2/1987 | Zounek et al. | 379/62 |
| 4,656,653 | 4/1987 | Oda et al. | 379/61 |
| 4,658,416 | 4/1987 | Tanaka | 379/57 |
| 4,659,878 | 4/1987 | Dinkins | 370/71 |
| 4,672,658 | 6/1987 | Kavehrad et al. | 379/63 |
| 4,694,485 | 9/1987 | Iwase | 379/62 |
| 4,706,274 | 11/1987 | Baker | 379/61 |

*Primary Examiner*—Robert Lev
*Attorney, Agent, or Firm*—Sughrue, Mion, Zinn, Macpeak, and Seas

[57] ABSTRACT

In a radio key telephone system connected through N subscriber lines to a telecommunication switching system, each of M (where M is larger than N) terminal stations has a multiple access radio transceiver capable of switching to one of (N+1) radio channels including N two-way communication channels and a two-way signaling channel, a display for indicating busy-idle states of the subscriber lines and a controller for controlling the display. A base station establishes the N two-way communication channels and the two-way signaling channel and includes a controller which interacts with the terminal-station controllers through the signaling channel in response to originating and terminating call-request signals to cause the displays of the terminal stations to indicate a busy state of a subscriber line and cause the transceiver of a terminal station to switch to the communication channel associated with that subscriber line and interacts with them through that communication channel in response to call-clearing signals to cause the transceiver of that terminal station to return to the signaling channel and cause the displays of the terminal stations to indicate an idle state of that subscriber line.

5 Claims, 12 Drawing Sheets

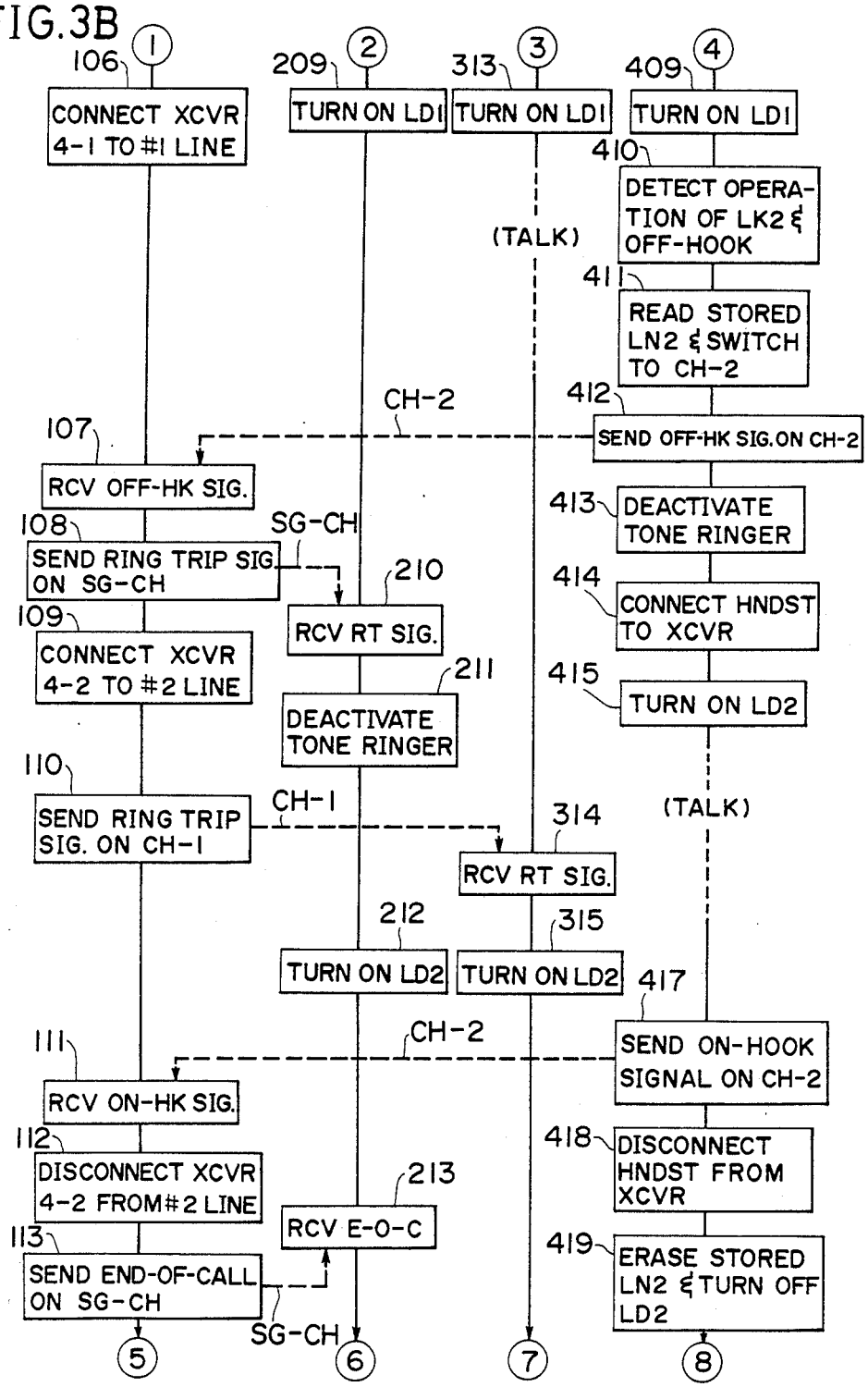

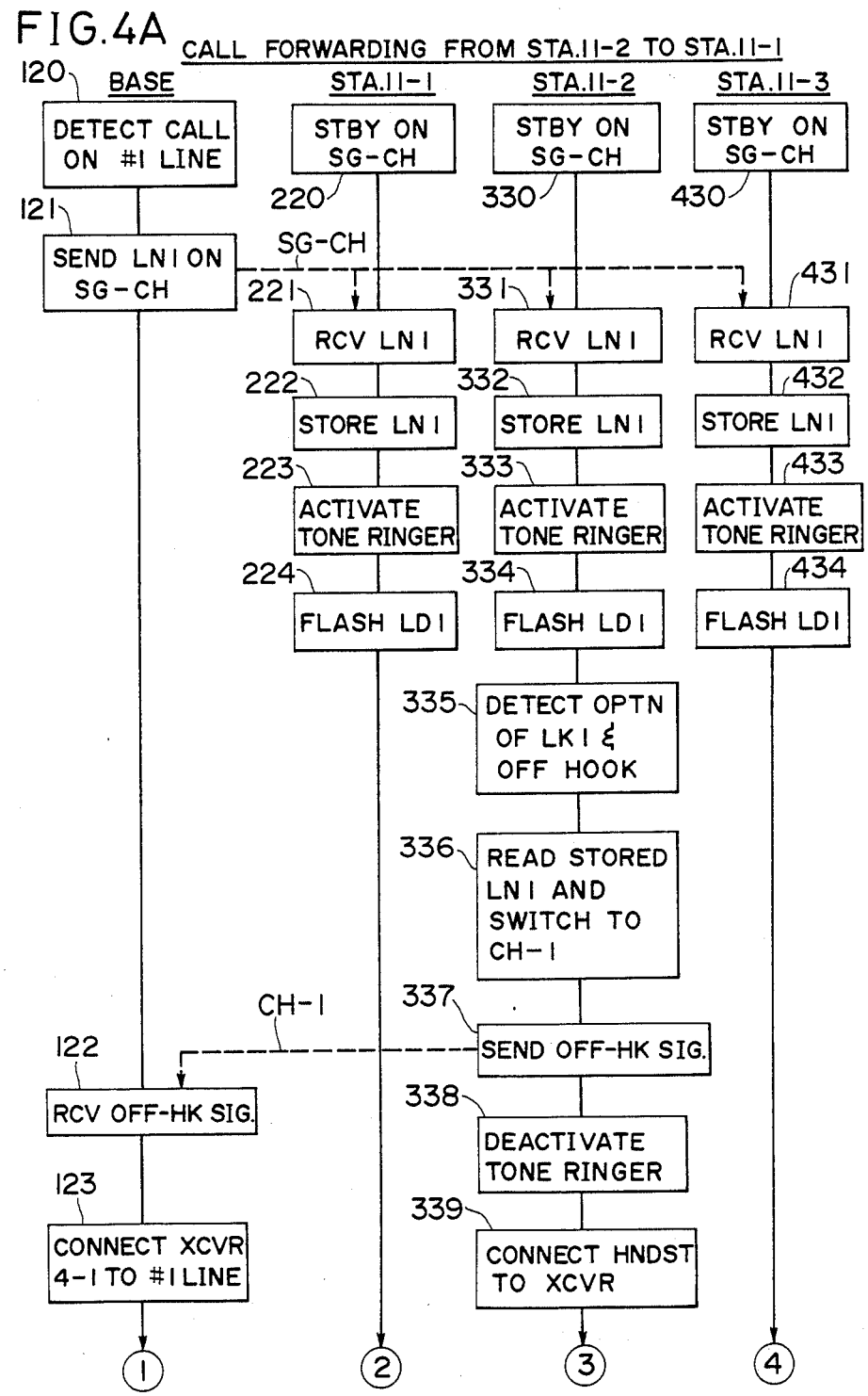

CALL ORIGINATION

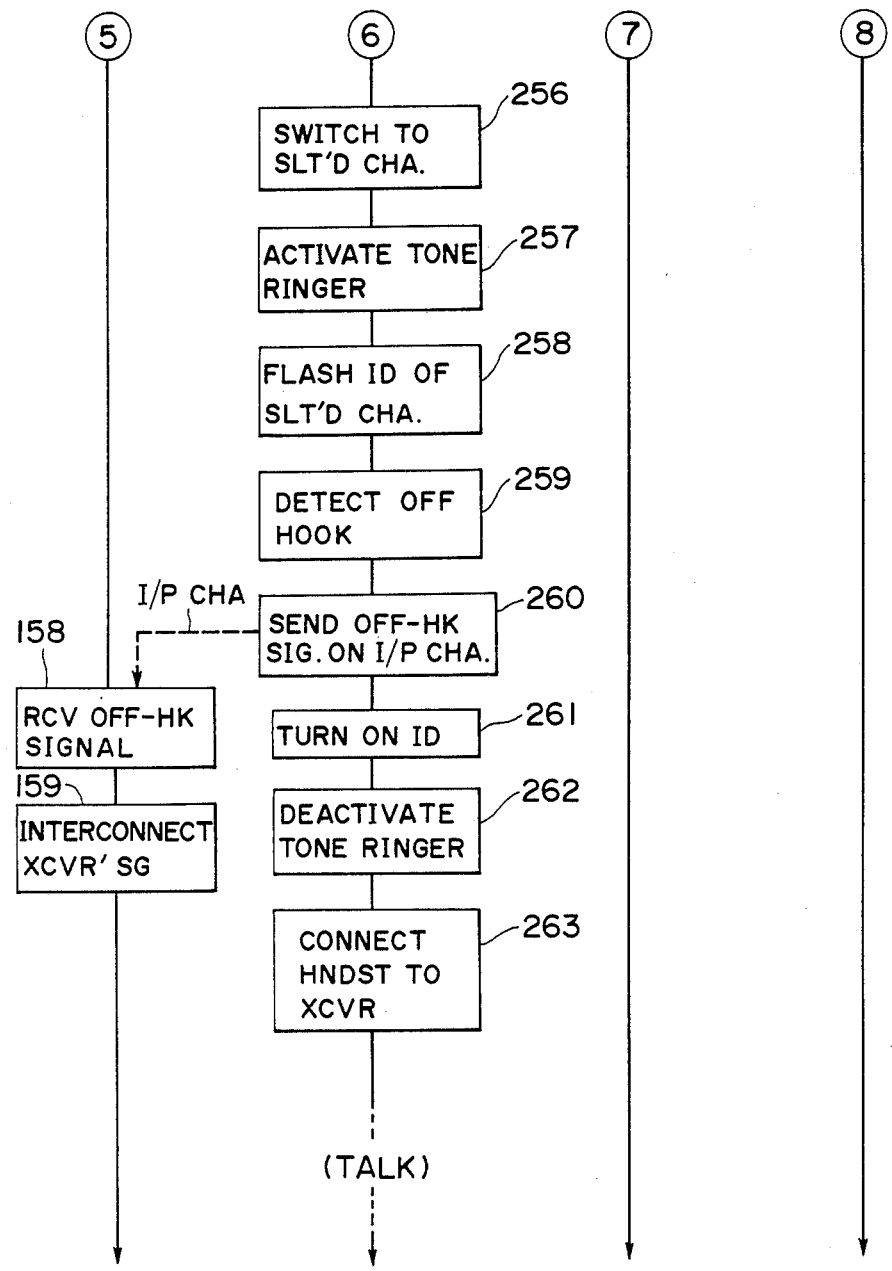

RADIO KEY TELEPHONE SYSTEM HAVING A COMMON SIGNALING CHANNEL

BACKGROUND OF THE INVENTION

The present invention relates to a radio communications system, and more particularly to a radio key telephone system.

Conventional cordless telephones are respectively associated with base stations which are connected by respective subscriber lines to a switching system of the public telephone network. Thus, the base stations and hence the subscriber lines are needed as many as there are cordless telephones. If a group of cordless telephones is owned and operated by common users, it is not economical to provide subscriber lines and base stations as many as there are cordless telephones if it is seldom that all cordless telephones would attempt to originate a call simultaneously.

SUMMARY OF THE INVENTION

It is therefore an object of the present invention to provide a radio key telephone system for a plurality of cordless telephones and a common base station to permit it to provide line concentration by switching the cordless telephones to a smaller number of subscriber lines.

More specifically, the radio key telephone system of the present invention is connected through N subscriber lines to a telecommunication switching system and comprises M (where M is larger than N) terminal stations and a base station. Each terminal station comprises a multiple access radio transceiver capable of switching to one of (N+1) radio channels including N two-way communication channels and a two-way signaling channel, a display for indicating busy-idle states of the subscriber lines and a controller for controlling the display and transmitting an originating call-request signal over the signaling channel and a first call-clearing signal over the communication channels. The base station includes a radio transceiver for establishing the N two-way communication channels from the subscriber lines to the terminal stations and the two-way signaling channel to the terminal stations and a controller which is associated with the subscriber lines for receiving a terminating call-request signal and a second call-clearing signal from the switching system and is further associated with the base-station radio transceiver for receiving the originating call-request signal and the first call-clearing signal from the terminal stations. The base-station controller interacts with the terminal-station controllers through the signaling channel in response to the originating and terminating call-request signals to cause the displays of the terminal stations to indicate a busy state of one of the subscriber lines and cause the transceiver of one of the terminal stations to switch to the communication channel associated with that subscriber line and interacts with the terminal-station controllers through that communication channel in response to the first and second call-clearing signals to cause the transceiver of that terminal station to return to the signaling channel and cause the displays of the terminal stations to indicate an idle state of that subscriber line.

Preferably, the controller of each terminal station transmits a call-forwarding signal identifying a destination terminal station over one of the communication channels in response to a manual input. The base-station controller is responsive to the call-forwarding signal for interacting with the controller of the destination terminal station over the signaling channel to cause its transceiver to switch to the communication channel through which the call-forwarding signal has been received.

In a further preferred form of the invention, the transceiver of each terminal station is capable of switching to first and second two-way radio interphone channels and its controller transmits an interphone call signal over the signaling channel in response to a manual input. The system includes a second base-station radio transceiver for establishing the first and second two-way radio interphone channels to the terminal stations. The base-station controller is responsive to the interphone call signal for interacting over the signaling channel with the controller of the terminal station which has transmitted the interphone call signal to cause its transceiver to switch to the first two-way radio interphone channel and interacting over the signaling channel the controller of the terminal station to which the interphone call signal is directed to cause its transceiver to switch to the second two-way radio interphone channel to thereby establish an interphone connection.

BRIEF DESCRIPTION OF THE DRAWINGS

The present invention will be described in further detail with reference to the accompanying drawings, in which:

FIGS. 3A to 3C are flowcharts describing operations of the base station controller and cordless station controllers involved in successive terminating calls;

FIGS. 4A to 4D are flowcharts describing controllers operations when a terminating call is forwarded from one cordless station to another;

FIGS. 6A to 6C are flowcharts describing controllers operations when an interphone call is established.

DETAILED DESCRIPTION

Figure 1:
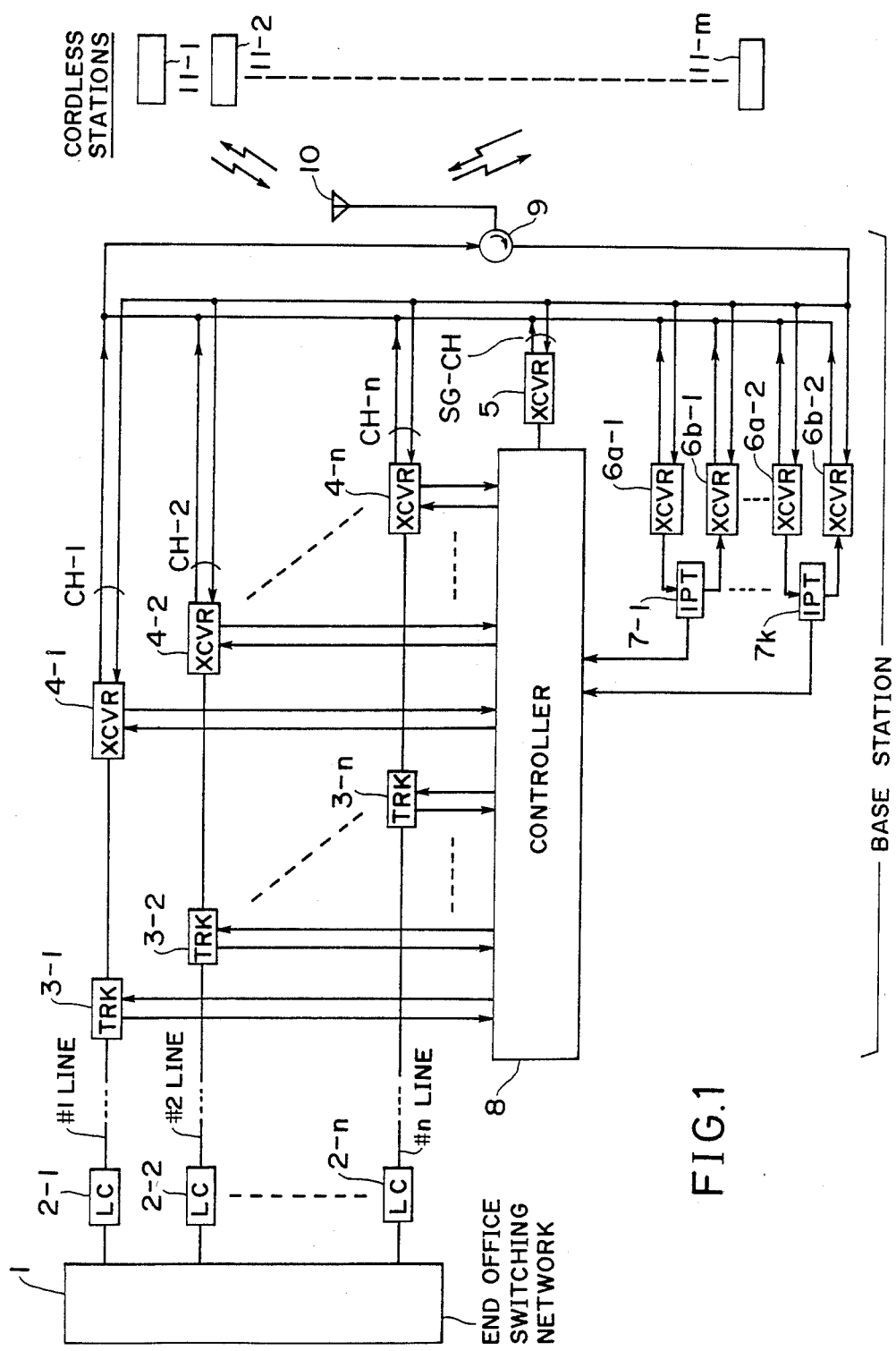
FIG. 1 is a block diagram of a base station of the radio key telephone system of the present invention in which cordless stations are associated with the base station through two-way communication channels and a two-way common signaling channel.

Referring to FIG. 1, there is shown a cordless key telephone system according to a preferred embodiment of the present invention. The cordless key telephone system comprises a base station and a plurality of cordless telephones or stations 11-1 through 11-$m$. The base station comprises two-way trunk circuits 3-1 through 3-$n$ which are connected respectively via subscriber lines #1 through #n to line circuits 2-1 through 2-$n$ of an end office switching network 1, where n is smaller than m. Radio transceivers 4-1 through 4-$n$ are respectively associated with the trunk circuits 3-1 through 3-$n$. Each transceiver 4 is provided with a two-wire four-wire converter, or hybrid having a four-wire circuit connected to a duplexer 9 and thence to a common antenna 10 and a two-wire circuit connected through the associated trunk circuit 3 to the associated line circuit 2. Each transceiver 4 has therefore a two-way radio channel carried on a set of particular transmit and receive frequencies to establish #1 through #n communication channels between the base station and cordless stations 11 for transmission and reception of speech signals and control signals for signaling purposes when call is in progress. As viewed from the cordless stations, the base station provides concentration by switching the cordless stations 11 to the smaller number of line circuits 2 and as viewed from the end office switching network it provides deconcentration by switching the line circuits 2 to the larger number of cordless stations 11.

For transmission and reception of control signals exclusively, there is additionally provided a radio transceiver 5 having a four-wire circuit connected to the duplexer 9 to establish a two-way common signaling channel between the base station and cordless stations 11. In addition to the communication and signaling channels, a plurality of two-way interphone channel pairs #1 through #k (where k is usually smaller than n). Each interphone channel pair is composed of radio transceivers 6a and 6b each having a four-wire circuit connected to the duplexer 9 and a two-wire circuit connected to an interphone trunk circuit 7.

All control functions are centralized in a controller 8 which receives an incoming signal from each trunk circuit 3 when a call is received from the end office and an outgoing signal from each cordless station by way of the signaling transceiver 5. Controller 8 is also responsive to a signal from each interphone trunk circuit 7. Controller 8 is further associated with each communication channel transceiver 4 to transmit and receive inaudible low-frequency signaling information to and from cordless stations 11.

As will be described later in detail, all the cordless stations and the base station are connected to the common signaling channel when they remain in an idle, or standby state to provide instant exchange of signaling information for call origination, call termination, call forwarding, interphone call setup and call clearing operations. When a call is terminated from the end office switching network 1 to the cordless stations 11, one of the line circuits 2 receives a ringing signal from the switching network 1 and activates the associated trunk circuit 3 to notify this fact to the controller 8 to cause it to send a ringing signal through the transceiver 5 over the common signaling channel. When a call is originated from a cordless station, the latter communicates this fact to the controller 8 over the common signaling channel. Controller 8 proceeds to select an idle subscriber line by testing the busy/idle conditions of the trunk circuits 3-1 through 3-n and connects the trunk circuit of the selected line to the associated transceiver 4.

Figure 2:
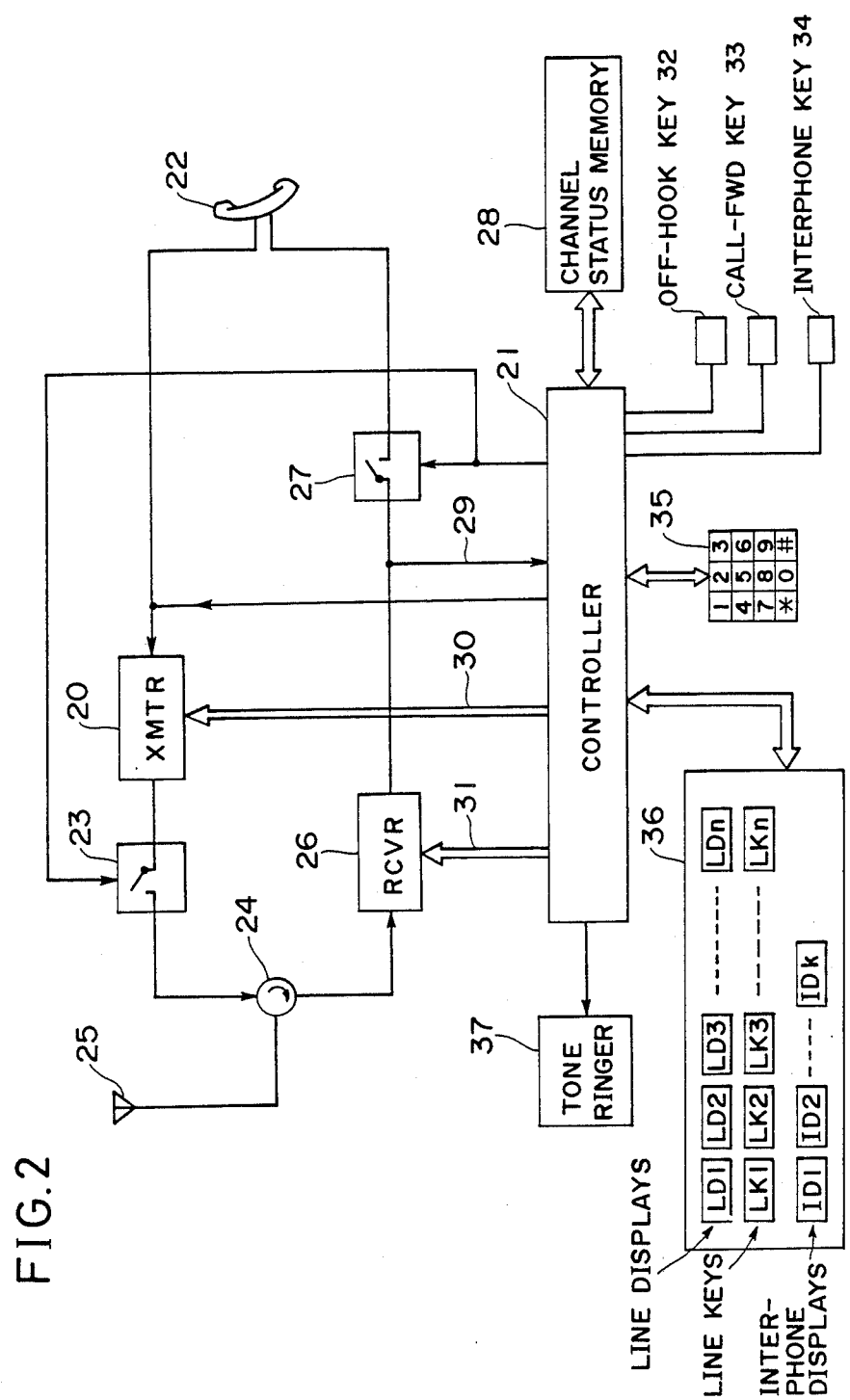
FIG. 2 is an illustration of details of each of the cordless stations of FIG. 1.

Referring to FIG. 2, each cordless station 11 is composed of a multiple access radio transceiver including a transmitter 20 and a receiver 26. Transceiver 20 has (n+1+2k) selectable transmit frequencies respectively corresponding to the receive frequencies of the n communication channels, the single signaling channel and the 2k interphone channels. These transmit frequencies are selected by a controller 21 to establish a transmit channel from a given cordless station to any one of the transceivers 4, 5 and 6 of the base station. A telephone handset 22 provides a speech signal to the input of transmitter 20 and controller 21 supplies signaling information to it. The output of transmitter 20 is connected via a switch 23 to the transmit input of a duplexer 24 and thence to an antenna 25. The receive output of duplexer 24 is connected to the receiver 26. Receiver 26 has, likewise, (n+1+2k) selectable receive frequencies corresponding respectively to the transmit frequencies of the n communication channels, the single signaling channel and the 2k interphone channels. Controller 21 provides receive frequency selection in cooperation with the selection of a transmit frequency. The output of receiver 26 is connected via a switch 27 to the handset 22. Switches 23 and 27 are activated by controller 21 to interconnect the handset 22 and the transceiver formed by transmitter 20 and receiver 26 when a communication channel is established. The cordless station includes a channel memory 28 to store the channel identification number of a communication channel being selected in cooperation with the associated subscriber line when the controller 21 receives a channel select signal received from the base station controller 8 via line 29.

Controller 21 reads the stored channel identification number out of the memory 28 to control the transmitter 20 and receiver 26 through buses 30 and 31 to select their transmit and receive frequencies to cause them to be tuned to the frequencies of a communication channel selected by the base station. Controller 21 is further associated with an off-hook key 32, a call forward key 33 and an interphone key 34. Off-hook key 32 is operated when the subscriber originates or answers a call. Call forward key 33 is operated when the subscriber wishes to forward a call received from the end office switching network to another cordless station. Interphone key 34 is operated when a call is to be established between cordless stations 11. A multi-frequency dialing key arrangement 35 is connected to the controller 21 for generating dialed information for purposes of establishing a connection to any subscriber of the end office or generating an identification number of a destination cordless station when a received call is to be forwarded or an interphone call is to be terminated thereto. An indicator/line selector keyboard 36 includes an array of line display elements LD1 through LDn corresponding to the #1 through #n subscriber lines for indicating which of the subscriber lines are idle or busy. Corresponding to the line display elements, an array of line keys LK1 through LKn is provided to be operated when a call is received from the end office switching network 1. When a call is originated from a given cordless station, a subscriber line is automatically selected by the base station controller 8 and a corresponding line display element LD is shone to indicate the selected line number to allow a subscriber to press the line key LK associated with the line display element LD. Interphone display elements ID1 through IDk are provided to indicate the busy/idle status of the interphone channel pairs #1 through #k. A tone ringer 37 is connected to the controller 37 to generate alert the subscribers when a call is received. Each cordless station is connected to the base station controller 8 through the common signaling channel when it is in an idle state to monitor the arrival of signaling information therefrom and to transmit a call request signal over that signaling channel when a call is originated.

The operation of the cordless key telephone system of the invention will now be described with reference to FIGS. 3 to 6 in which cordless stations 11-1, 11-2 and 11-3 are illustrated for purposes of simplicity and the dotted lines indicate the channels over which signaling information are transmitted.

Figure 3A:
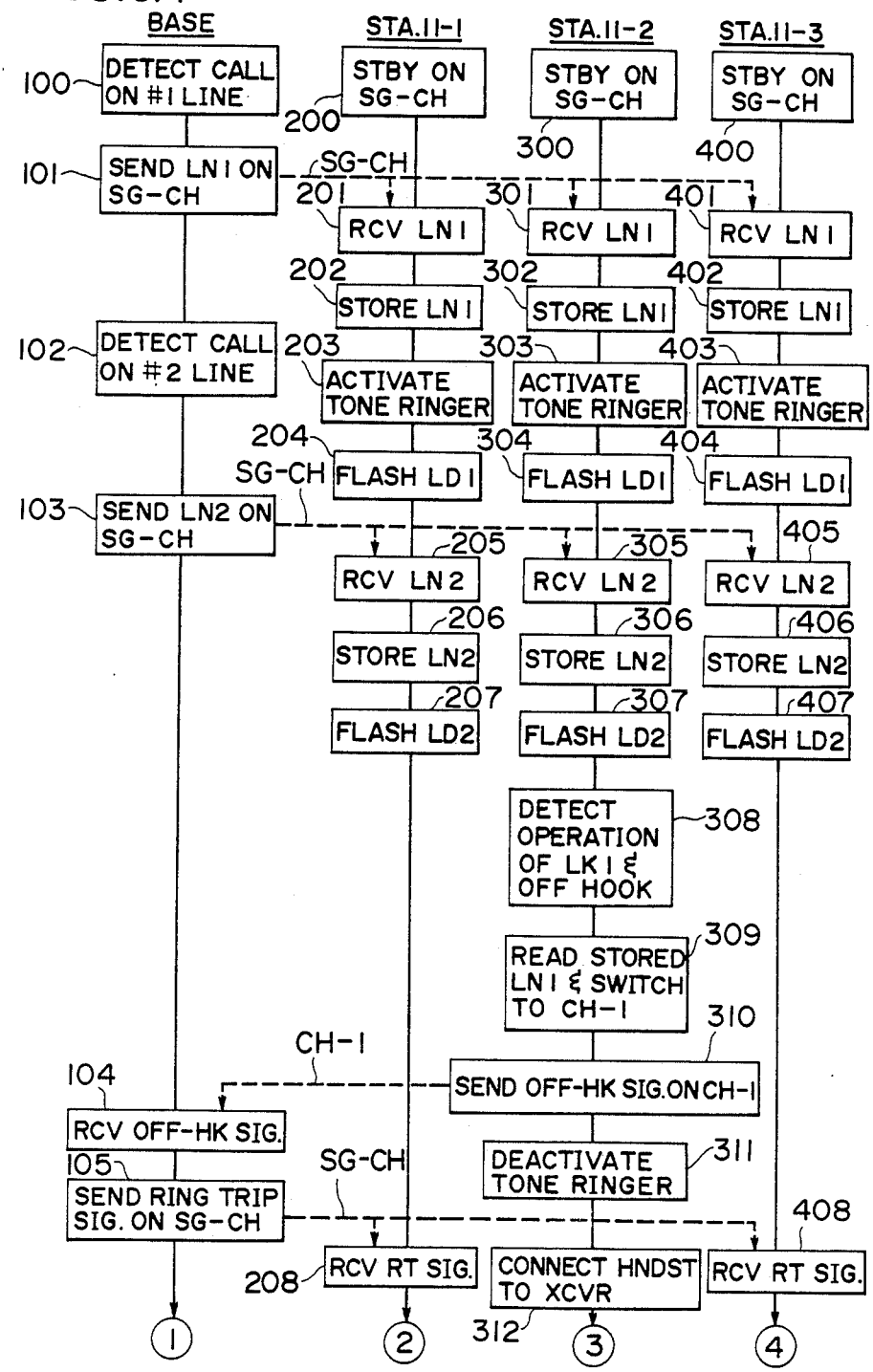
Figure 3C:
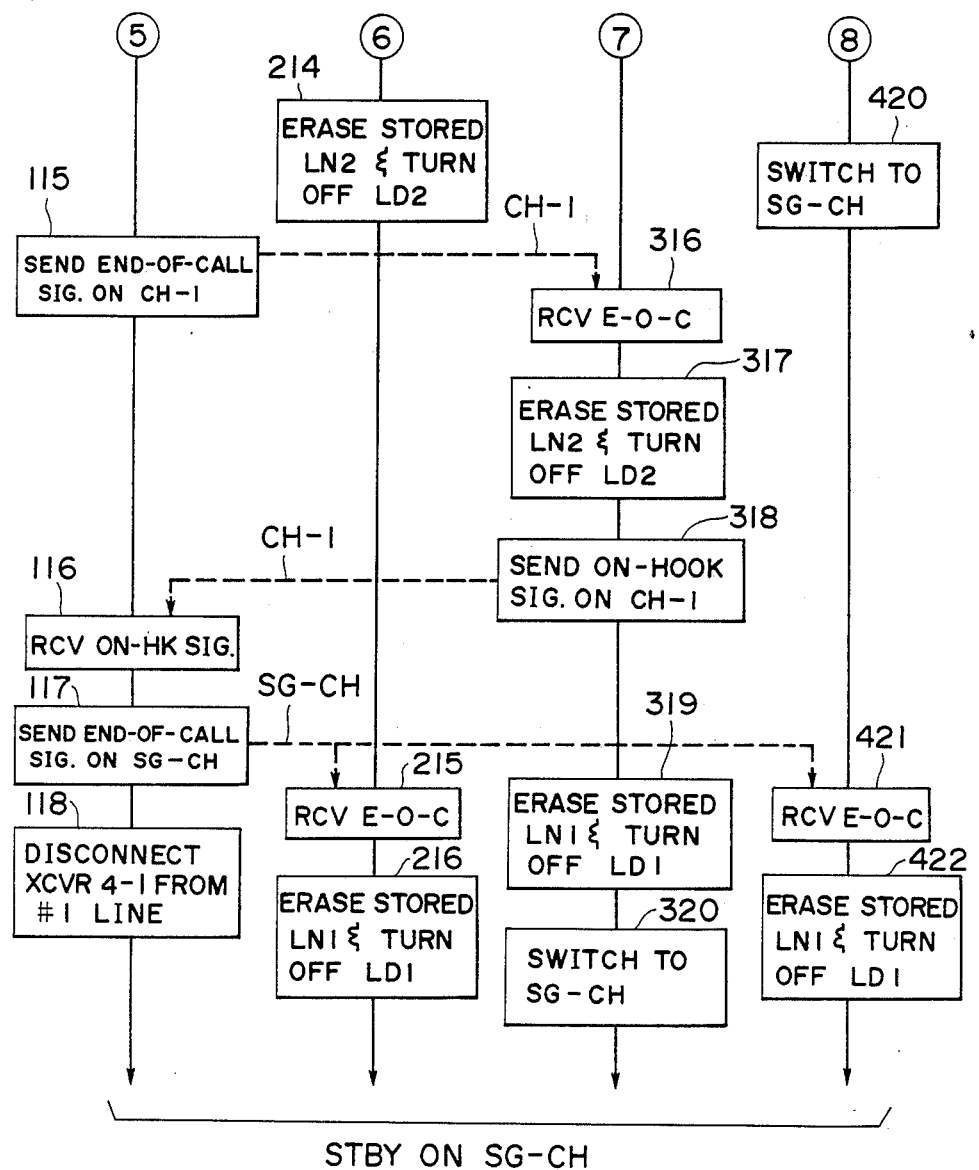
Figure 4B:
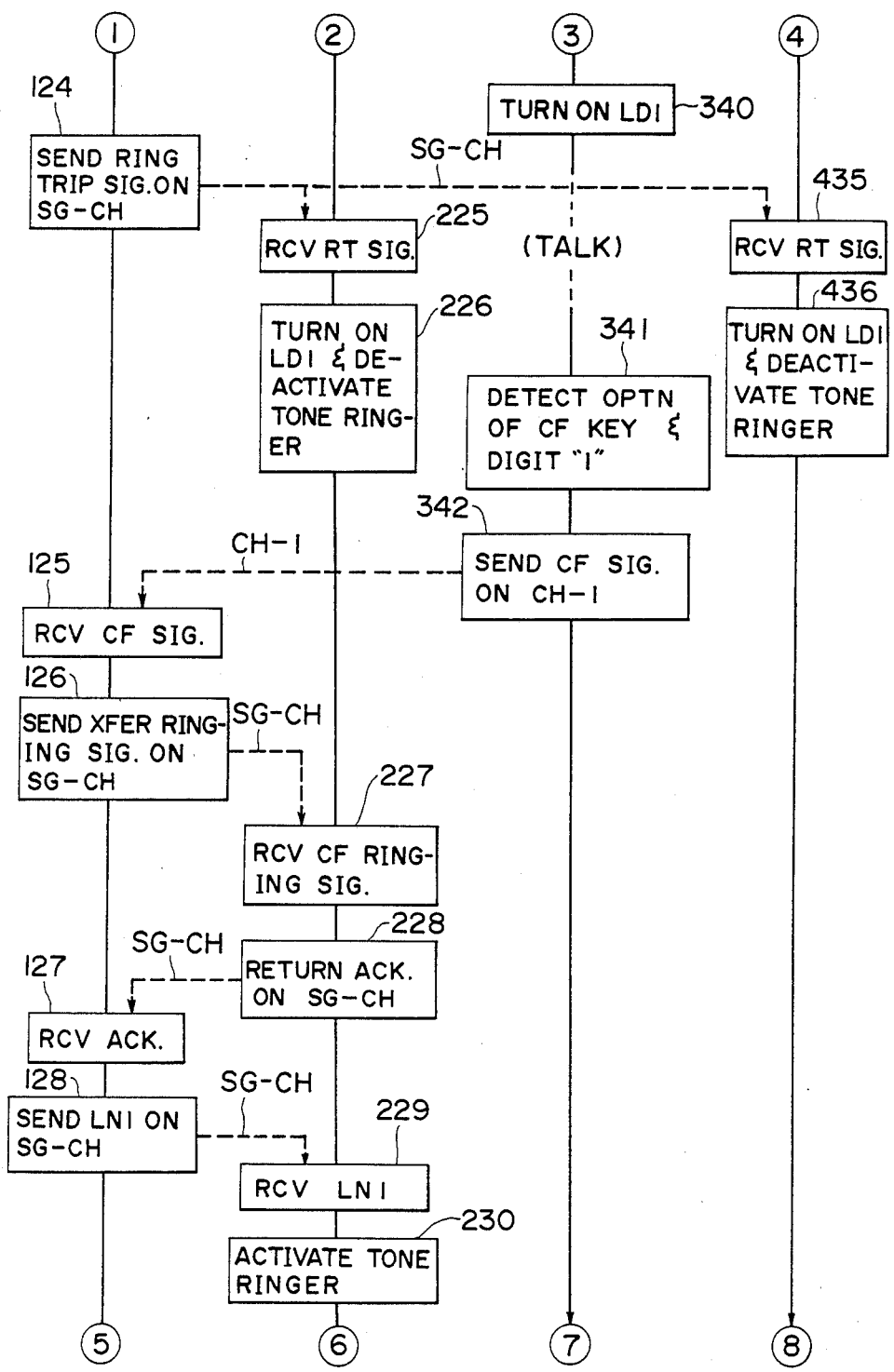
Figure 4C:
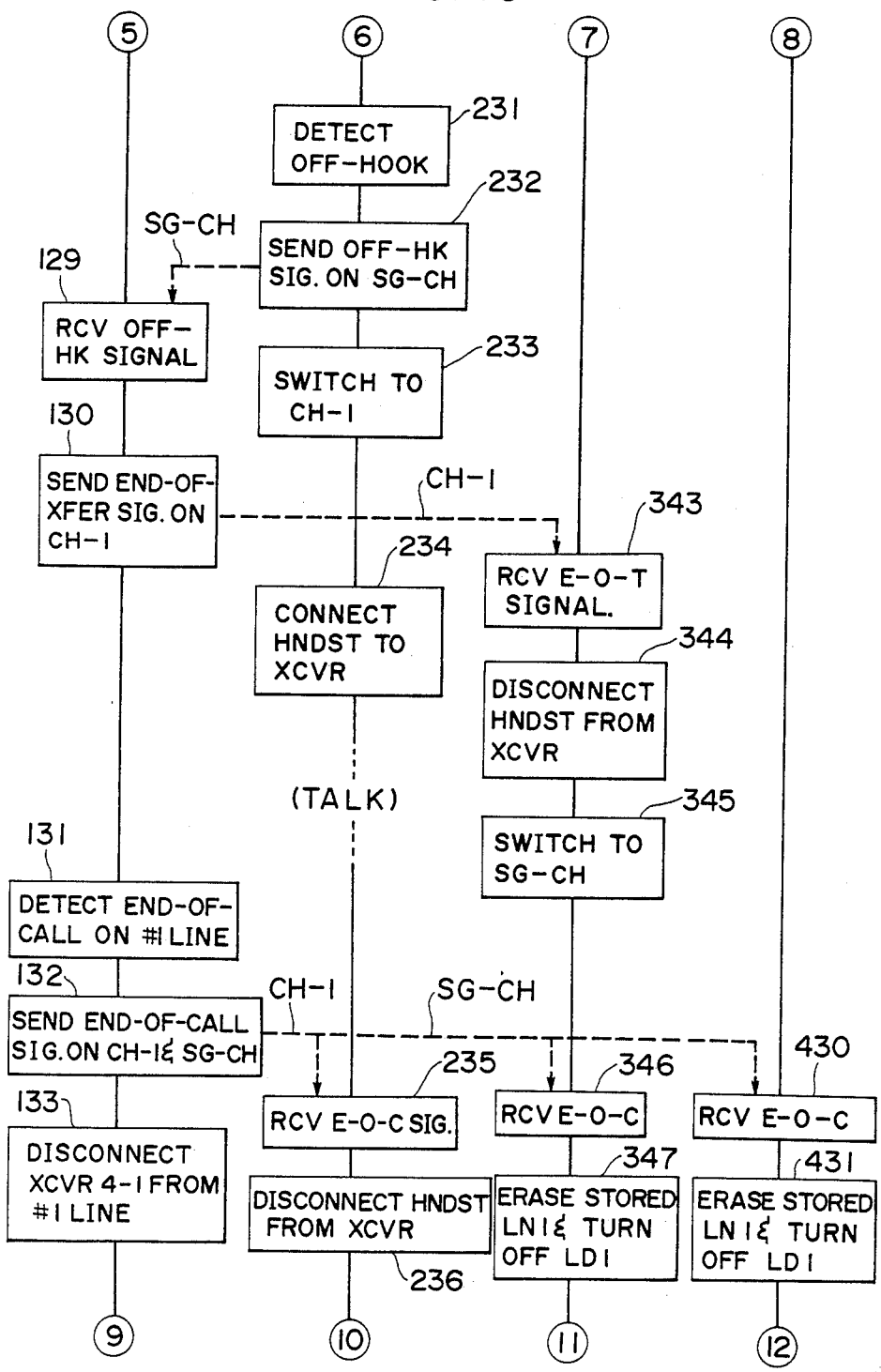
Figure 4D:
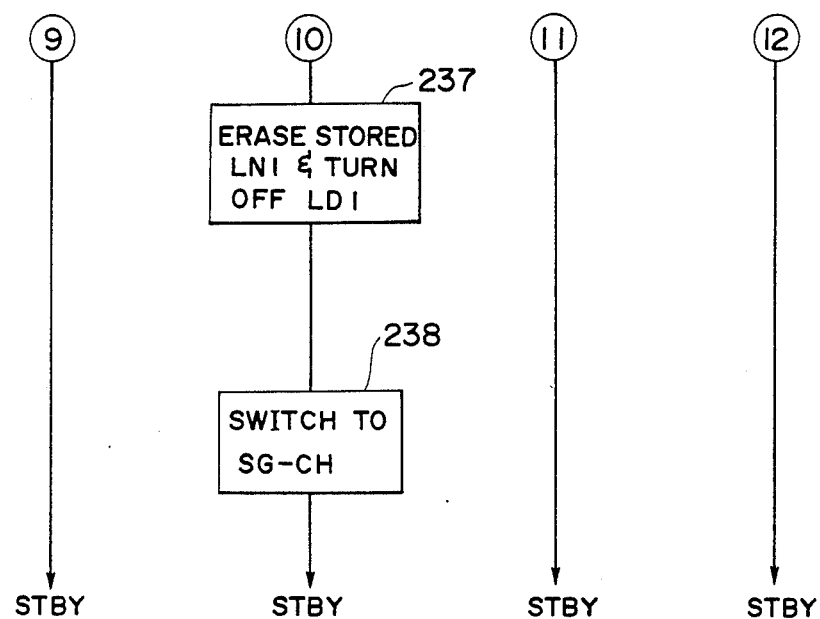

In FIGS. 3A to 3C, the operation is concerned with incoming calls to the #1 and #2 subscriber lines in succession from the end office switching network 1. The arrival of a first incoming call on the #1 subscriber line causes a ringing signal to be applied to the line circuit 2-1. Controller 8 is notified of this fact from the trunk circuit 3-1 (block 100) and sends the identification number (LN1) of the #1 subscriber line through transceiver 5 on the signaling channel to all the cordless stations 11 which have been in a standby condition on the signaling channel (blocks 200, 300 and 400). Cordless stations 11-1, 11-2 and 11-3 receive the identification number LN1 (blocks 201, 301 and 401) and their controllers 21 store that number into their own memory 28 (blocks 202, 302 and 402), activate their tone ringer 37 to alert the subscribers (blocks 203, 303 and 403) and flash their line display element LD1 (blocks 204, 304 and 404). Meanwhile, the base station controller 8 detects the arrival of a second incoming call at the #2 subscriber line (block 102) and sends a line identification number LN2 over the signaling channel to the cordless stations 11-1, 11-2 and 11-3, which receive this signal (blocks 205, 305 and 405), store the identification number LN2 into their memory (blocks 206, 306 and 406) and flash their line display element LD2 (blocks 207, 307 and 407).

Assume that cordless station 11-2 answers the first incoming call by operating its line key LD1 and off-hook key 32. Controller 21 of station 11-2 detects the operation of line key LK1 and off-hook key 32 (block 308) and proceeds to address its memory 28 in response to the line key LK1 to read the stored line identification number LN1 therefrom and controls its transmitter 20 and receiver 26 to cause them to switch to the #1 communication channel (block 309). Station 11-2 controller 21 then sends an off-hook signal over the #1 communication channel to the base station controller 8 (block 310), deactivates its tone ringer 37 (block 311), operates the switches 23 and 27 to connect the handset 22 to the transmitter 20 and receiver 26 (block 312) and turns on the line display element LD1 (block 313).

The off-hook signal sent on the #1 communication channel from the cordless station 11-2 is received by the base station controller 8 (block 104) to cause it to apply a ring trip signal to the signaling channel (block 105) and operate the trunk circuit 3-1 to connect the transceiver 4-1 to the #1 subscriber line (block 106) to form a "dc" loop at the line circuit 2-1, thus tripping the ringing signal of the first call so that a talking connection is established between the line circuit 2-1 and cordless station 11-2. This ring trip signal is received by cordless stations 11-1 and 11-3 since they remain switched to the signaling channel (blocks 208 and 408). The line display elements LD1 of cordless stations 11-1 and 11-3 are turned on to indicate that #1 subscriber line is busy (blocks 209 and 409).

Assume that cordless station 11-3 answers the second incoming call by operating its line key LD2 and off-hook key 32. Controller 21 of station 11-3 detects the operation of line key LK2 and off-hook key 32 (block 410) and proceeds to address its memory 28 in response to the line key LK2 to read the stored line identification number LN2 therefrom and causes its transmitter 20 and receiver 26 to switch to the #2 communication channel (block 411). Station 11-3 controller 21 then sends an off-hook signal over the #2 communication channel to the base station controller 8 (block 412), deactivates its tone ringer 37 (block 413), operates the switches 23 and 27 to connect the handset 22 to the transmitter 20 and receiver 26 (block 414) and turns on the line display element LD2 (block 415).

The off-hook signal sent on the #2 communication channel from the cordless station 11-3 is received by the base station controller 8 (block 107) to cause it to apply a second ring trip signal to the signaling channel (block 108) and control the trunk circuit 3-2 to connect the transceiver 4-2 to the #2 subscriber line to form a "dc" loop at the line circuit 2-2 (block 109), tripping the ringing signal of the second call so that a talking connection is established between the line circuit 2-2 and cordless station 11-3. The ring trip signal sent on the signaling channel is received by cordless station 11-1 (block 210) since it remains switched to the signaling channel. The station 11-1 tone ringer is deactivated (block 211) and its display element LD2 is turned on (block 212) to indicate that #2 subscriber line is busy. The base station controller 8 applies an inaudible low-frequency ring trip signal to the #1 communication channel through transceiver 4-1 (block 110). Cordless station 11-2 receives the low-frequency ring trip signal (block 314) to turn on its line display element LD2 (block 315).

When cordless station 11-3 goes on hook, its controller 21 sends an on-hook signal over the #2 communication channel to the base station, disconnects its handset from the transceiver (block 418), erases the stored line identification number LN2 from the memory 28 and turns off line display element LD2 (block 419) and goes to block 420 to switch the transceiver to the signaling channel. Base station controller 8 receives the on-hook signal sent from the cordless station 11-3 through the transceiver 4-2 (block 111) and disconnects it from the #2 subscriber line (block 112) and sends an end-of-call signal over the signaling channel (block 113). Cordless station 11-1 receives this end-of-call signal (block 213) and erases its stored line identification number LN2 and goes to block 214 to turn off its line display element LD2. The end-of-call signal further sent from the base station over the #1 communication channel (block 115) to be received by station 11-2 (block 316) to cause it to erase its stored line identification number LN2 and turn off its line display element LD2 (block 317). If station 11-2 goes off hook, it sends an on-hook signal over the #1 communication channel (block 318), erases the stored line identification number LN1 and turns off line display element LD1 (block 319) and causes its transceiver to switch to the signaling channel (block 320). Base station receives the on-hook signal from station 11-2 (block 116) and sends an end-of-call signal (block 117) over the signaling channel to be received by stations 11-1 and 11-3 (blocks 215 and 421) to cause their stored line identification number LN1 to be erased and their line display element LD1 to be turned off (blocks 216 and 422).

Call forwarding operation will be described with reference to FIGS. 4A to 4D. It is assumed that an incoming call from the end office switching network 1 is terminated at the #1 subscriber line (block 120) while stations 11-1, 11-2 and 11-3 stay idle on the signaling channel (blocks 220, 330 and 430), answered by station 11-2 and is subsequently forwarded to station 11-1. The detection of the incoming call results in the transmission of a signal representative of the identification number (LN1) of the #1 subscriber line over the signaling channel (block 121). Each of the idle stations 11-1, 11-2 and 11-3 receives the line number (blocks 221, 331 and 431), stores it in memory (block 222, 332 and 432), activates the tone ringer (blocks 223, 333 and 433) and flashes the line display element LD1 (blocks 224, 334 and 434).

When station 11-2 goes off hook, its controller 21 detects the operation of line key LK1 and off-hook key (block 335), reads the stored line identification number LN1 and causes its transceiver to switch to the #1 communication channel (block 336), sends an off-hook signal over the #1 communication channel (block 337), deactivates the tone ringer (block 338), connects the handset to the transceiver (block 339) and turns on line display element LD1 (block 340). Base station controller 8 receives the off-hook signal (block 0 122), connects the transceiver 4-1 to the #1 subscriber line (block 123) to allow the line circuit 2-1 to trip the ringing signal of the incoming call to establish a talking connection between the line circuit 2-1 and station 11-2, and sends a ring trip signal over the signaling channel (block 124). Stations 11-1 and 11-3 receive the ring trip signal (blocks 225 and 435), turn on line display element LD1 and deactivate the tone ringer (block 226 and 436).

When station 11-2 subscriber wishes that the incoming call be forwarded to station 11-1, the call forward key 33 is operated and the digit "1" key on the dialing device 35 is depressed to identify the station 11-1. The operation of the call forward key 33 and the entry of dialed information are detected (block 341) and a call forward signal is applied to the #1 communication channel (block 342). Base station receives the call forward signal (block 125) and sends a call-forward ringing signal over the signaling channel (block 126). Station 11-1 receives the call-forward ringing signal (block 227) and returns an acknowledgement signal on the signaling channel (block 228), which is received by the base station (block 127) to cause it to send the identification number LN1 over the signaling channel. Station 11-1 receives it and activates the tone ringer (blocks 229 and 230). When station 11-1 goes off hook (block 231), controller 21 sends an off-hook signal on the signaling channel (block 232) and causes its transceiver to switch to the #1 communication channel (block 233) and connect to the handset (block 234) to establish a talking connection between the line circuit 2-1 and station 11-1. Upon receipt of the off-hook signal from station 11-1 (block 129), base station sends an end-of-call-forward signal on the #1 communication channel. On receiving the end-of-call-forward signal (block 343), station 11-2 causes its transceiver to be disconnected from the handset (block 344) and switch to the signaling channel (block 345).

Assume that the end-office side calling subscriber goes off hook (block 131), base station sends an end-of-call signal simultaneously on the #1 communication channel and the signaling channel (block 132) and disconnects the transceiver 4-1 from the #1 subscriber line (block 133). Station 11-1 receives the end-of-call signal (block 235), disconnects the handset from the transceiver (block 236), erases the stored line number LN1, turns off line display element LD1 (block 237) and switches to the signaling channel (block 238). Each of the stations 11-2 and 11-3 also receives the end-of-call signal through the signaling channel (blocks 346 and 430) and erases the stored line number LN1 and turns off line display element LD1 (blocks 347 and 431).

Figure 5A:
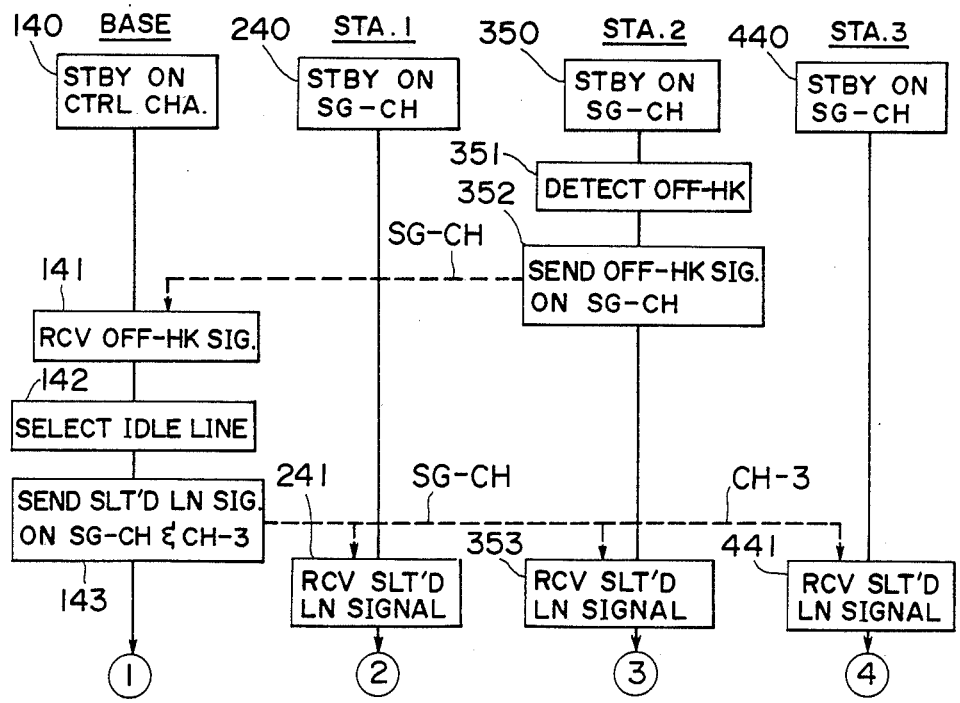
FIGS. 5A and 5B are flowcharts describing controllers operations during call origination.
Figure 5B:
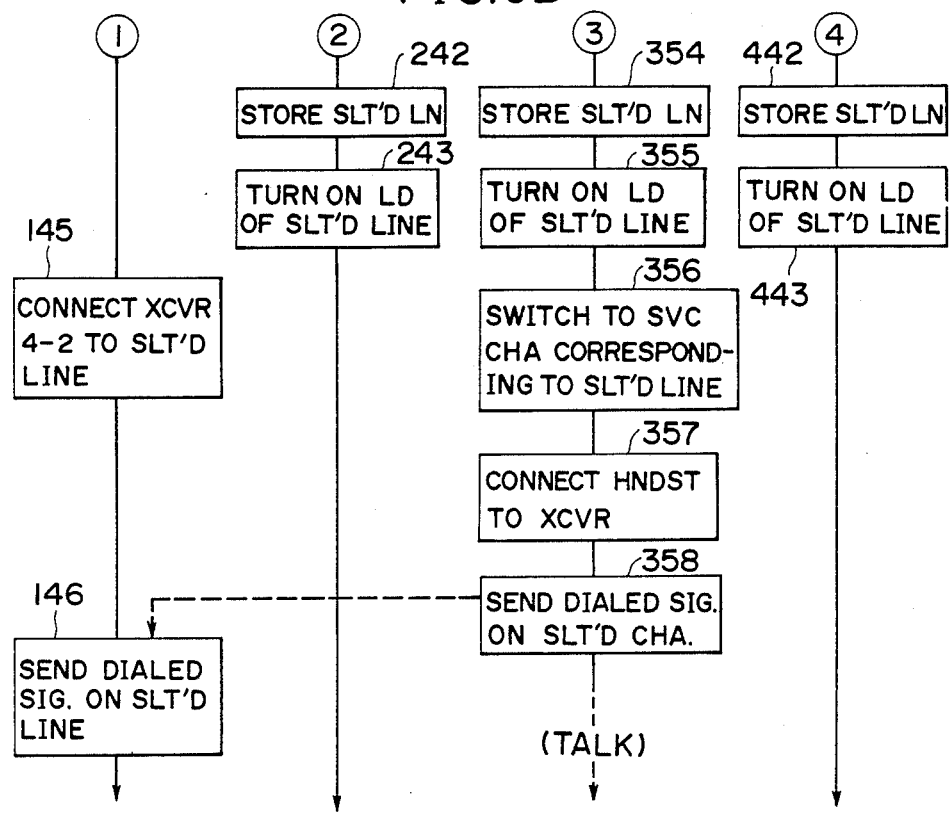

FIGS. 5A and 5B are illustrations of a sequence of operations involved in an outgoing call originated from cordless station 11-2 (block 350) to an end-office subscriber on the assumption that base station and cordless stations 11-1 stay idle on the signaling channel (blocks 140 and 240) and station 11-3 is using the #3 communication channel. Station 11-2 controller first detects the operation of off-hook key (block 351) and sends an off-hook signal on the signaling channel (block 352). Upon receipt of the off-hook signal (block 141), the base station proceeds to select an idle subscriber line and sends the identification number of the selected subscriber line over the signaling channel and sends it at an inaudible frequency over the #3 communication channel (block 143) and connects the transceiver 4-2 to the selected subscriber line (block 145). All the cordless stations receive the selected line number (blocks 241, 353 and 441), store it in their channel memory 28 (blocks 242, 354 and 442) and turn on their line display element of the selected line (blocks 243, 355 and 443). Station 11-2 then switches its transceiver from the signaling channel to the communication channel associated with the selected subscriber line (block 356) and connects the handset to the transceiver (block 357) to thereby complete a dialing connection to the end office switching network 1 to allow the calling station 11-2 to receive a dial tone from the end office and send dial information on the selected communication channel (block 358) to the base station (block 146). At the end of an outgoing call, a series of call clearing actions takes place in a manner similar to that described with reference to FIGS. 3A, 3B and 3C.

Figure 6A:
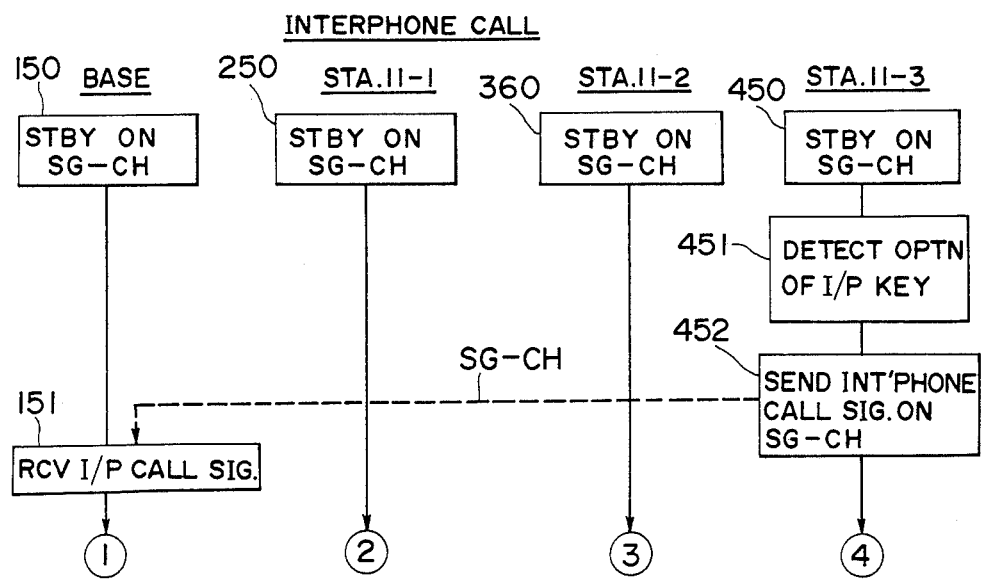
Figure 6B:
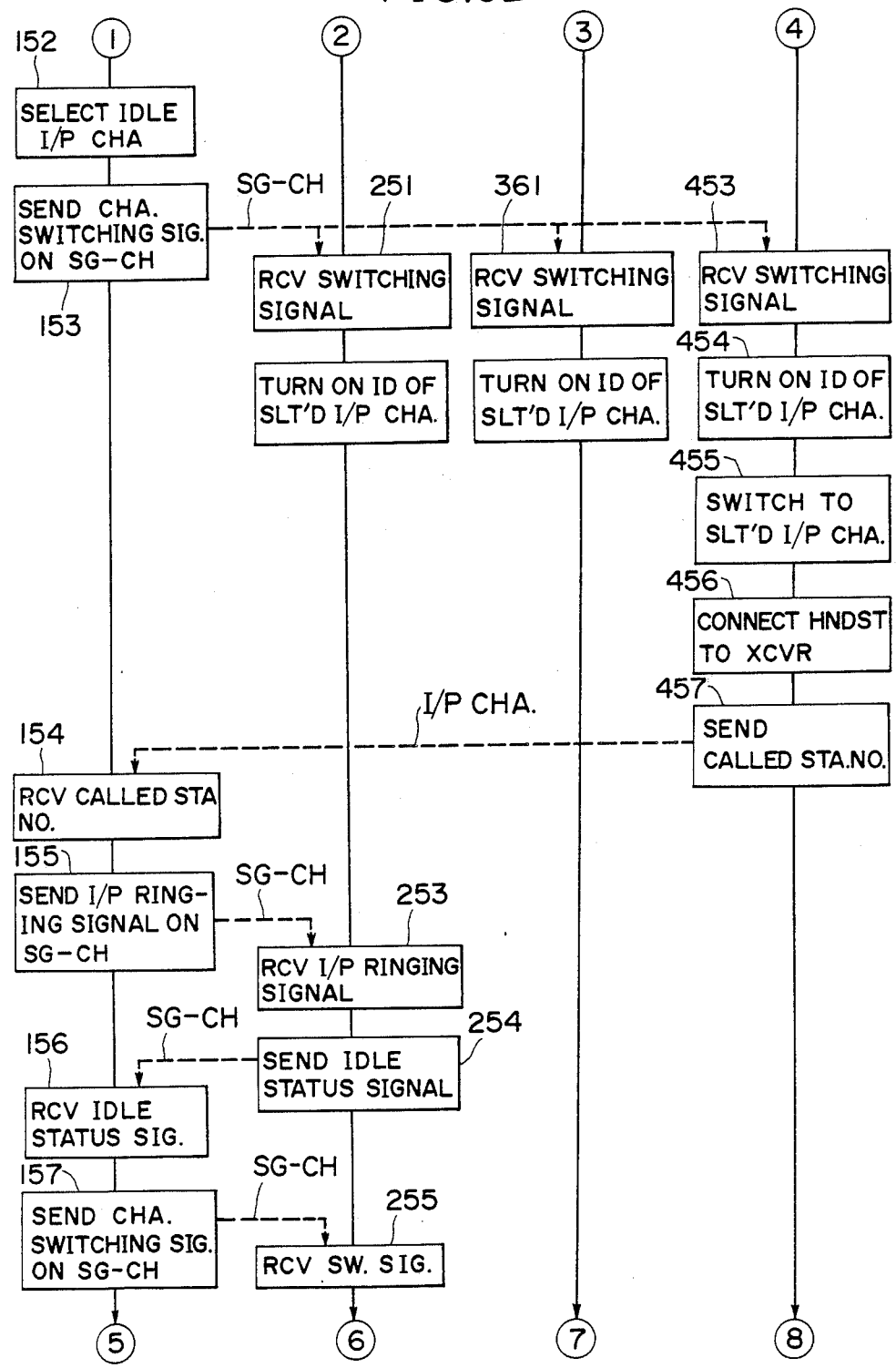

FIGS. 6A to 6C are illustrations of a sequence of operations involved in an interphone call originated from station 11-3 to station 11-1 with the base station and all the stations being initially idle on the signaling channel (blocks 150, 250, 360 and 450). Station 11-3 controller first detects the operation of interphone key 34 (block 451) and transmits an interphone call request signal over the signaling channel. Upon receipt of this interphone call request signal (block 151), the base station controller 8 selects an idle interphone trunk circuit 7 (block 152) and sends a channel switching signal identifying an interphone channel of the selected interphone trunk circuit 7 on the signaling channel (block 153). This interphone channel is furnished by the transceiver 6a connected to the incoming terminal of the selected interphone trunk circuit. Cordless stations 11-1, 11-2 and 11-3 receive the channel switching signal (blocks 251, 361 and 453) and turn on their interphone display element ID corresponding to the selected interphone trunk circuit 7 (blocks 252, 362 and 454). Station 11-3 controller proceeds to switch its transceiver to the interphone channel identified by the channel switching signal (block 455), connects its handset to the transceiver (block 456) to establish a dialing connection to receive an interphone dial tone from the selected interphone trunk circuit 7 and sends dialed information identifying a destination station, i.e., station 11-1 (block 457). The dialed information is received by the associated interphone trunk circuit 7 and passed to the controller 8 (block 154) which decodes the dialed information and sends an interphone ringing signal identifying the called station 11-1 over the signaling channel (block 155). Station 11-1 receives this ringing signal (block 253) and returns an idle status signal over the signaling channel it is idle (block 254). Upon receipt of the idle status signal (block 156), the base station controller 8 sends a channel switching signal over the signaling channel identifying the interphone channel provided by the transceiver 6b which is connected to the outgoing terminal of the selected interphone trunk circuit 7 (block 157). In response to this channel switching signal (block 255), station 11-1 switches to the identified interphone channel (block 256), activates its tone ringer (block 257) and flashes the interphone display element ID corresponding to the selected interphone trunk circuit (block 258). When station 11-1 goes off hook (block 259), it sends an off-hook signal to the associated interphone trunk circuit 7 (block 260), turns on the flashing interphone display element (block 261), detactivates the tone ringer (block 262) and connects its handset to the transceiver (block 263). The off-hook signal from station 11-1 is received by base station (block 158) to control the selected interphone trunk circuit 7 to interconnect the associated transceivers 6a and 6b to establish a talking connection between stations 11-3 and 11-1.

What is claimed is:

1. A radio key telephone system connected through N subscriber lines to a telecommunication switching system, comprising:

M terminal stations each comprising multiple access radio transceiver means capable of switching to one of (N+1) radio channels including N two-way communication channels and a two-way signaling channel, display means for indicating busy-idle states of said subscriber lines and control means for controlling said display means and transmitting a first call-request signal over said signaling channel and a first call-clearing signal over said communication channels, where M is greater than N;

base-station radio transceiver means for establishing said N two-way communication channels from said N subscriber lines to said terminal stations and establishing said two-way signaling channel to said terminal stations; and base-station control means associated with said N subscriber lines for receiving a second call-request signal and a second call-clearing signal from said switching system and associated with said base-station radio transceiver means for receiving said first call-request signal and said first call-clearing signal from said terminal stations, interacting with the control means of said terminal stations through said signaling channel in response to said first and second call-request signals to cause the display means of said terminal stations to indicate a busy state of one of said subscriber lines and cause the multiple access radio transceiver means of one of said terminal stations to switch to the communication channel which is associated with said one subscriber line and interacting with the control means of said terminal stations through said one communication channel in response to said first and second call-clearing signals to cause said multiple access radio transceiver means of said one terminal station to switch to said signaling channel and cause said display means of said terminal stations to indicate an idle state of said one subscriber line.

2. A radio key telephone system as claimed in claim 1, wherein said control means of each of said terminal stations transmits a call-forwarding signal identifying a destination terminal station over one of said communication channels in response to a manual input, and wherein said base-station control means is responsive to said call-forwarding signal for interacting with the control means of the destination terminal station over said signaling channel to cause the multiple access radio transceiver means thereof to switch to said communication channel over which said call-forwarding signal is transmitted.

3. A radio key telephone system as claimed in claim 2, wherein said base-station control means interacts, over said communication channel on which said call-forwarding signal has been received, with the control means of the source terminal station from which the call is forwarded to cause the multiple access radio transceiver means thereof to switch to the signaling channel when said destination terminal station goes off hook.

4. A radio key telephone system as claimed in claim 1, wherein the multiple access radio transceiver means of each of said terminal stations is further capable of switching to first and second two-way radio interphone channels and the control means of each of said terminal stations transmits an interphone call signal over said signaling channel in response to a manual input, further comprising:

second base-station radio transceiver means for establishing said first and second two-way radio interphone channels to said terminal stations, said base-station control means being responsive to said interphone call signal for interacting over said signaling channel with the control means of the terminal station which has transmitted said interphone call signal to cause the multiple access radio transceiver means thereof to switch to said first two-way radio interphone channel and interacting over said signaling channel the control means of the terminal station to which said interphone call signal is directed to cause the multiple access radio transceiver means thereof to switch to said second two-way radio interphone channel to thereby establish an interphone connection.

5. A radio key telephone system as claimed in claim 4, wherein the multiple access radio transceiver means of each of said terminal stations is further capable of switching to third and fourth two-way radio interphone channels, and wherein said second base-station radio transceiver means further includes means for establishing said third and fourth two-way radio interphone channels to said terminal stations and first and second interphone trunk circuits for respectively interconnecting said first and second two-way radio interphone channels and interconnecting said third and fourth two-way radio interphone channels, said base-station control means being responsive to said interphone call signal for selecting one of said first and second interphone trunk circuits and interacting over said signaling channel with the control means of the terminal station which has transmitted said interphone call signal to cause the multiple access radio transceiver means thereof to switch to one of the interphone channels associated with the selected interphone trunk circuit, interacting over said signaling channel with the control means of the terminal station to which said interphone call signal is directed to cause the multiple access radio transceiver means thereof to switch to the other of said associated interphone channels, and controlling said selected interphone trunk circuit to interconnect the associated interphone channels.

* * * * *

UNITED STATES PATENT AND TRADEMARK OFFICE
CERTIFICATE OF CORRECTION

PATENT NO. : 4,768,218
DATED : August 30, 1988
INVENTOR(S) : Yorita

It is certified that error appears in the above-identified patent and that said Letters Patent is hereby corrected as shown below:

COLUMN 7, LINE 10    Delete "(block 0 122)" insert --(block 122)--

Signed and Sealed this

Ninth Day of May, 1989

Attest:

DONALD J. QUIGG

*Attesting Officer*    Commissioner of Patents and Trademarks